Patented Feb. 26, 1929.

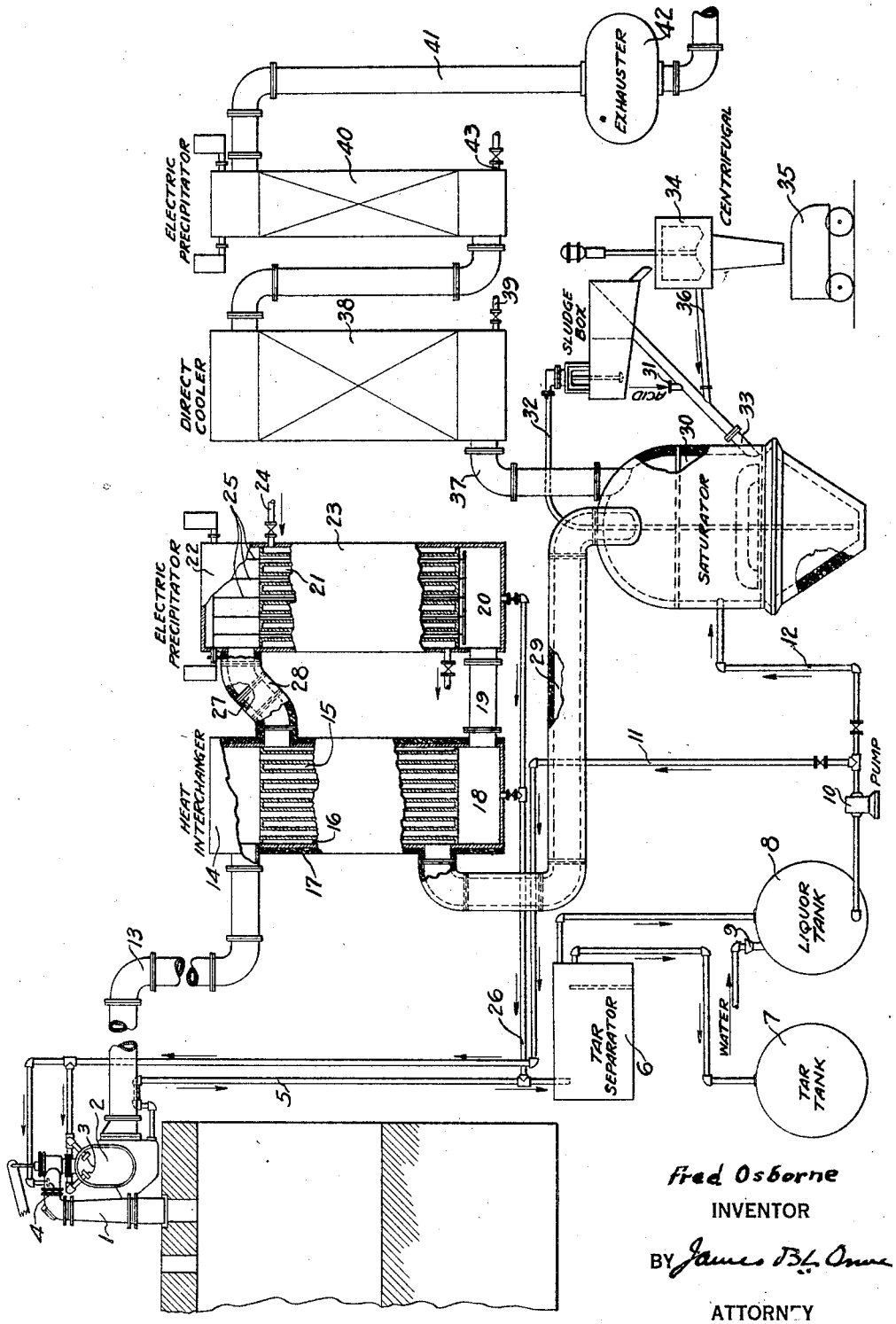

1,703,405

UNITED STATES PATENT OFFICE.

FRED OSBORNE, OF BIRMINGHAM, ALABAMA, ASSIGNOR TO SEMET-SOLVAY COMPANY, OF NEW YORK, N. Y., A CORPORATION OF NEW YORK.

RECOVERY OF AMMONIA.

Application filed April 12, 1927. Serial No. 183,188.

This invention relates to a process for the recovery of condensable materials from hot gases and particularly of ammonia from gases resulting from the distillation of coal as carried out in coke ovens and the like. It also relates to an apparatus which may be used for carrying out such process. The term "ammonia" as herein used, is intended to include not only free ammonia, by which is meant the gas in uncombined form, but also fixed ammonia, by which is meant compounds of ammonia, such as sulfate and chloride. The two terms "free" and "combined" ammonia are thus intended to embrace the forms in which ammonia may occur in such gases.

According to the present invention, I am able to recover ammonia with the use of relatively inexpensive apparatus compared with the usual types now in use, and to carry out the process of the invention with a relatively low cost of maintenance of such apparatus. My invention includes an electrical precipitator, a heat interchanger and a saturator. By the present invention the gas as produced, for example, by coke ovens, is brought to the saturator with part of its original heat still present and at a temperature materially above the dew-point for its normal water content, light oil and light tar vapor content. This gas, as it comes to the saturator, contains somewhat less than its full original ammonia content, equal approximately to the amount of fixed ammonia in the gas, the remainder of the ammonia content having been removed by ammonia sprays in the collector main along with the tar. After separation of this ammonia liquor from the tar by decanting, according to my invention, it is led directly to the saturator and is introduced to the liquid in the saturator. The amount of moisture thus introduced in the saturator both by the incoming gas containing ammonia and by the water introduced with the liquor is regulated so that the heat contained in the incoming gas plus that obtained from the reaction of ammonia and sulfuric acid in the saturator is sufficient to maintain the bath in a state of saturation and thus to keep up a constant precipitation of ammonium sulfate. At the same time there is also sufficient heat maintained in the gas flowing from the saturator so that there is no material precipitation in the saturator of the light oils or light tar vapors.

The invention accordingly comprises a process for the recovery of ammonia, from gas containing ammonia, water and other condensable substances, which includes partial cooling of the gas and separation of some ammoniacal condensate; cooling the gas by passing it in heat exchange with cool gas from a succeeding step; passing the gas through an electrical precipitator; passing the gas in heat exchange with the incoming gas as mentioned above and heating it; bringing the heated gas into contact with an ammonia recovery agent and introducing the ammoniacal condensate from the first step mentioned above directly into contact with the ammonia recovery agent. The invention also includes apparatus, which may be used in carrying out the process mentioned.

By my invention the gas coming from the coke ovens passes through the usual collector main and is there sprayed so that the gas is reduced to a temperature of say 120°–130° C. The gas then passes to the tubes of a heat interchanger, where it gives up some of its heat, emerging from the tubes at a temperature of approximately 100° C., and still conveying entrained tar particles. The gas passes then through the field of an electrical precipitator which removes the entrained tar and by means of a controlled cooling fluid applied to the space around the precipitator tubes reduces the gas temperature to approximately 80° C., and then upon passing through the jacket of the heat interchanger, is superheated so that its temperature is approximately 90°–100° C., at which temperature it passes to the saturator. The temperature 90° C. is about 10° C. above the dew point of the moisture in the gas, and this temperature is a safe one for operation to insure that the gases passing through the saturator will actually remove all water brought into the system by the gas, by the condensate and in the form of wash waters. This temperature also maintains in vapor form the tar vapors and light oils brought into the saturator with the gas. Of course the gas may be at a higher temperature than 90° C., if desired, to secure a more rapid evaporation, or it may be somewhat lower, providing a slower evaporation in the saturator. Where a temperature of about 90° C. is maintained, the superheated gas is sufficient not only to evaporate the excess water from the saturator, but also to maintain a temperature equal to or above that of the gas in the electrical precipitator. Consequently, substantially no condensation and separation of tar takes place in the saturator and the ammonium sulfate produced thereby is thus substantially free from tar. It will be noted that the heat delivered to the gas in the heat interchanger, which has been taken from the hot gas passing therethrough on the way to the electrical precipitator, together with the heat of reaction becomes the heat available for evaporation.

After leaving the saturator, the gas, substantially free from ammonia, passes to a cooler, where it is cooled to 30° C. approximately. Condensate thrown down in the cooler is removed and the gas passes then to a second electrical precipitator, where the remaining tar particles may be removed, and thence to the exhauster and holder.

In the accompanying drawing the figure shows somewhat diagrammatically an apparatus suitable for carrying out the process of the invention.

The apparatus selected for illustration includes a source of gas containing ammonia and other condensable materials resulting from the distillation of coal, for example, a gas produced by a by-product coke oven. With such an oven, the uptake pipe 1 is connected with the usual collector main 2 into which project the usual ammonia sprays 3, which act with the spray 4 in the up-take valve box to spray the hot gases coming from the coke ovens. Tar and ammonia pass from the lower part of the collector main through the pipe 5 to tar separator 6 in which the tar and ammoniacal liquor are separated, tar passing to tar tank 7 and ammoniacal liquor passing to liquor tank 8. The liquor tank is supplied with a water inlet pipe 9 for adding fresh water to the liquor to replenish the supply removed from the system by the hot gases. Part of the liquor is pumped by a pump 10 through the valved pipe 11 to the sprays 3 and 4, while part of it is pumped by the same pump through a valved line 12 to the saturator, as will be described later.

The hot gases, after spraying with ammoniacal liquor, pass through the cross-over pipe 13 to the head of a heat interchanger 14, preferably insulated to avoid the radiation of the heat of the hot gases and to insure that such heat will be taken up by the somewhat cooled gases going into heat exchange relation with these hot gases, as will be explained later. The gases pass from the head of the heat interchanger through tubes 15, surrounded by a jacket 16 covered with a heavy insulating coating 17. These tubes conduct the gases to the bottom space 18 and thence by a pipe 19 to the bottom space 20 of an electrical precipitator which is preferably uninsulated, and in which cooling of the gases may take place either through cooling by the surrounding atmosphere or by a cooling fluid such as water. The gases pass from the bottom of the electrical precipitator through tubes 21 to the head of the electrical precipitator 22. The tubes are enclosed by a jacket 23 in which the cooling fluid may be circulated by means of the pipes 24, one at the top and one at the bottom of the jacket. The electrical precipitation is accomplished as here shown by a series of charged conductors 25 passing through the tubes in which the gas is flowing. The tar and other matter removed by the electrical precipitator and the heat interchanger is drawn off respectively from the bottom of each of these devices through valved pipe 26 leading to the tar separator 6. From the top 22 of the electrical precipitator the gas, cooled to approximately 80° C., passes by means of a pipe 27 covered with an insulation 28 to the jacket 16 of the heat interchanger. The cooled gas surrounds the pipes through which the hot gas from the oven is flowing, and heat is absorbed so that the temperature of the gas passing from the jacket is approximately 90°–100° C. on leaving the heat interchanger. This gas then passes through an insulated pipe 29 to an insulated saturator 30. The insulation on the pipe and saturator is substantially as heavy as that on the heat interchanger, and is used to maintain the temperature of the gas as far above 80° C. as may be, so that evaporation in the saturator may constantly take place, thus avoiding accumulation of mother liquor.

The gas passing into the saturator bubbles up through a solution of sulfuric acid continuously replenished through the pipe 31, flowing directly into the mother liquor as mentioned below, returning from the sludge box to the saturator. Ammonia in the incoming gas reacts to form ammonium sulfate. In addition, as heretofore noted, ammonia liquor is introduced through the pipe 12 into the saturator. The ammonia content of this liquor also combines with the sulfuric acid to form ammonium sulfate. The ammonium sulfate formed settles to the bottom of the saturator in the usual manner, and is ejected by air or steam through a pipe 32 into sludge box 33, where ammonium sulfate crystals are separated out and mother liquor is returned through the pipe 33 to the saturator. During its passage back to the saturator, as above noted, the mother liquor is supplied with sulfuric acid through the pipe 31. The crystals pass from the sludge box into a centrifugal separator 34 and the dried crystals then drop into a truck 35 or other conveying means. Mother liquor and wash water from the centrifugal separator also pass by pipe 36 to pipe 33 and thence into the saturator.

The heat in the gas, being considerably above the dew-point of its moisture content, is able to evaporate the mother liquor collected in the saturator 30 and thus continuous precipitation and removal of crystals from the saturator into the sludge box and continuous removal from the sludge box into the centrifugal separator and from thence into the conveyor, occurs.

In addition, precipitation of benzol, other light oils, and light tar vapors in the saturator is avoided, because the heat of the gas is sufficient to keep these materials in a gaseous state and they are thus carried along by the gas stream through a pipe 37 leading from the saturator to a direct cooler 38. Direct condensation by spraying in the cooler is preferred as it provides economy in the use of cooling water. The direct cooler still further lowers the temperature, and precipitation of water, some light oils and light tar vapors occurs therein, which is drawn off through the pipe 39. Naphthalene and condensate removed from the cooler is separated in the usual manner, as in evaporating or cooling pans. The gas, containing some entrained water vapor, oil and tar vapors, then passes to a second smaller electrical precipitator 40, in which these substances are removed and the cleaned gas then passes by a pipe 41 to an exhauster 42 from which it passes to the holder. Condensate in the electrical precipitator is removed through a valved pipe 43.

It will be noted, in connection with the above arrangement, that due to the high temperature, viz, 100°–120° C., at which the gas is maintained in coming from the collector main and in passing to the saturator, the condensation of ammonia from the gas prior to reaching the saturator is relatively small as compared with a condensate that would be obtained if the gas were reduced to below 80° C. It has been found that the small amount of condensed ammoniacal liquor can be safely added to the saturator as indicated through pipe 12 thus avoiding the use and operation of expensive ammonia distillation apparatus. The insulation on the heat interchanger pipes leading to and from it as well as on the saturator, insures a maintenance of temperature in the gas so that when it reaches the saturator, it is at a sufficiently high temperature to cause the desired evaporation of mother liquor. According to the invention, the water is removed prior to passing the gas through the exhauster, thus lowering the duty imposed thereon and maintaining suction throughout the system.

As many apparently widely different embodiments of this invention may be made without departing from the spirit thereof, it will be understood that I do not intend to limit myself to the specific embodiments herein described except as indicated in the appended claims.

I claim:

1. A process for the recovery of ammonia from gas containing ammonia, water and other condensable substances, which comprises the following steps: (a) cooling the gas by passing it into heat exchange relationship with cooled gas from step (b); (b) passing the gas through an electrical precipitator, cooling the gas and removing condensate therefrom; (c) passing the gas in heat exchange relationship with the incoming gas in step (a); and passing the gas to a saturator for removing ammonia.

2. A process as set forth in claim 1, in which the gas is cooled to about 80° C. in the precipitator and is then heated above 80° C. during heat exchange.

3. A process as set forth in claim 1, in which the gas is passed to a saturator containing a bath of sulfuric acid while its temperature is maintained up to and through the bath at least at 80° C. to avoid moisture accumulation in the bath.

4. A process for the recovery of ammonia from gas containing ammonia, water and other condensable substances, which comprises the following steps: (a) cooling the gas; (b) passing the cooled gas through an electrical precipitator; (c) passing the gas into heat interchanging relation with the incoming gas in step (a) and passing the gas to a saturator for removing ammonia.

5. A process for the recovery of ammonia from gas containing ammonia, water and other condensable substances, which comprises partial cooling of the gas and separation of some ammoniacal condensate, removing other condensate from the cooled gas by an electrical field while still further cooling the gas, heating the gas emerging from the field to a temperature at or greater than that of the gas entering the field, bringing the heated gas into contact with an ammonia recovery agent, and introducing the ammoniacal condensate directly into contact with the ammonia recovery agent.

6. A process as set forth in claim 5, in which the partial cooling through the treatment in the electrical field lowers the temperature to not less than approximately 80° C. and in which the subsequent heating is within the approximate range of 80° to 100° C.

7. A process for the recovery of ammonia from gas containing ammonia, water and other condensable substances, which includes the following steps: (a) partial cooling of the gas and separation of some ammoniacal condensate; (b) cooling the gas by passing it in heat exchange with cool gas from step (c); (c) passing the gas through an electrical precipitator while still further cooling it; (d) passing the gas in heat exchange relationship with the gas in step (b); (e) bringing the heated gas from step (d) into contact with an ammonia recovery agent and introducing the ammoniacal condensate from step (a) directly into contact with the ammonia recovery agent.

8. A process as set forth in claim 7, in which the gas is cooled to about 80° C. in the precipitator and is then heated to a temperature above 80° C. in the heat exchange.

9. A process as set forth in claim 7, in which the gas is passed to a saturator containing a bath of sulfuric acid, while its temperature is maintained up to the bath above 80° C. to avoid moisture accumulation in the bath.

10. A process for the recovery of ammonia from gas containing ammonia, water and other condensable substances, which includes the following steps: (a) partial cooling of the gas and separation of some ammoniacal condensate; (b) cooling the gas by passing it in heat exchange with cool gas from step (c); (c) passing the gas through an electrical precipitator while still further cooling it; (d) passing the gas in heat exchange relationship with the gas in step (b); (e) bringing the heated gas from step (d) into contact with an ammonia recovery agent and introducing the ammoniacal condensate from step (a) directly into contact with the ammonia recovery agent; cooling the ammonia-freed gas to about 30° C. and removing the condensate; separating the remaining condensate in the gas by the action of an electrical field and passing the gas through an exhauster.

11. An apparatus for treating hot gases containing tar, ammonia and water from coke ovens and the like, which comprises a heat interchanger having a heat-conveying portion for receiving gas from such source and a heat-receiving portion for containing gas to be heated, an electrical precipitator, a conduit connecting the precipitator entrance with the heat-conveying portion of the interchanger, a conduit connecting the exit of the precipitator with the entrance of the heat-receiving portion of the interchanger, an ammonia saturator and a conduit for connecting the exit of the heat-receiving portion of the interchanger to said saturator.

12. An apparatus for treating hot gases containing tar, ammonia and water from coke ovens and the like, which comprises a heat interchanger having tubes for receiving gas from the coke oven and a jacket for holding gas to be heated, an electrical precipitator having an entrance and an exit, a conduit connecting the precipitator entrance with said tubes, a conduit connecting the exit of the precipitator with said jacket, an ammonia saturator, and a conduit for connecting said jacket to said saturator.

13. An apparatus for treating hot gases containing tar, ammonia and water in vapor form from a coke oven or similar source, comprising in combination an electrical tar precipitator, a saturator for the absorption of ammonia, a heat interchanger independent of said precipitator and said saturator, a pipe connecting the said interchanger with the coke oven, a pipe connecting the electrical precipitator with the heat interchanger to allow cooled gas from the precipitator to flow into heat exchange relationship with hot gas from the coke oven, and a pipe connecting the heat interchanger with the saturator to allow the gas heated in the heat interchanger to flow to the saturator.

14. An apparatus for treating gases containing tar, ammonia and water in vapor form, comprising in combination, an electrical tar precipitator, an ammonia saturator, a heat interchanger interposed between the precipitator and the saturator, a water condenser connected to the saturator, a second electrical precipitator connected to the condenser, and an exhauster connected to the second precipitator.

15. An apparatus for treating hot gases containing tar, ammonia and water in vapor form from a coke oven or similar source, comprising in combination, a collector main, a tar separator for separating tar and ammonia flowing from the main, an electrical tar precipitator, a saturator for the absorption of ammonia, a heat interchanger independent of said precipitator and said saturator, a pipe connecting said interchanger with the coke oven, a pipe connecting the electrical precipitator with the heat interchanger to allow cooled gas from the precipitator to flow in heat exchange relationship with hot gas from the coke oven, a pipe connecting the heat interchanger with the saturator to allow the gas heated in the heat interchanger to flow to the saturator, and direct connection between the tar separator and the saturator for introducing ammonia directly from the separator into the saturator.

In witness whereof I have hereunto set my hand.

FRED OSBORNE.